United States Patent [19]

Wagensommer

[11] 4,016,342
[45] Apr. 5, 1977

[54] PROCESS AND PRODUCT
[75] Inventor: Joseph Wagensommer, Westfield, N.J.
[73] Assignee: Exxon Research and Engineering Company, Linden, N.J.
[22] Filed: Jan. 7, 1976
[21] Appl. No.: 647,151

Related U.S. Application Data

[63] Continuation of Ser. No. 556,088, March 7, 1975, abandoned, which is a continuation of Ser. No. 267,441, June 29, 1972, abandoned.

[52] U.S. Cl. .................................. 526/65; 526/282; 526/916
[51] Int. Cl.² .............. C08F 210/00; C08F 212/00
[58] Field of Search .................... 526/65, 282, 916

[56] References Cited
UNITED STATES PATENTS

| | | | |
|---|---|---|---|
| 2,889,314 | 6/1959 | Fritz | 260/94.9 |
| 3,523,929 | 8/1970 | Paige et al. | 260/80.78 |
| 3,725,364 | 4/1973 | Wagensommer et al. | 260/80.78 |

*Primary Examiner*—Joseph L. Schofer
*Assistant Examiner*—A. L. Clingman
*Attorney, Agent, or Firm*—William T. Clarke

[57] ABSTRACT

In a process for producing elastomers of ethylene and $C_3$ to $C_{10}$ alpha-olefins, improved products, higher catalyst efficiency, improved monomer conversion and control of molecular weight distribution are obtained by the use of staged reactors wherein the monomer feed is divided between the reactors, the catalyst feed is added to the first reactor and the cocatalyst feed is divided with a different cocatalyst supplied to the second reactor. The process is applicable in either a divided single reactor or in the use of multiple reactors.

8 Claims, 1 Drawing Figure

U.S. Patent     April 5, 1977     4,016,342
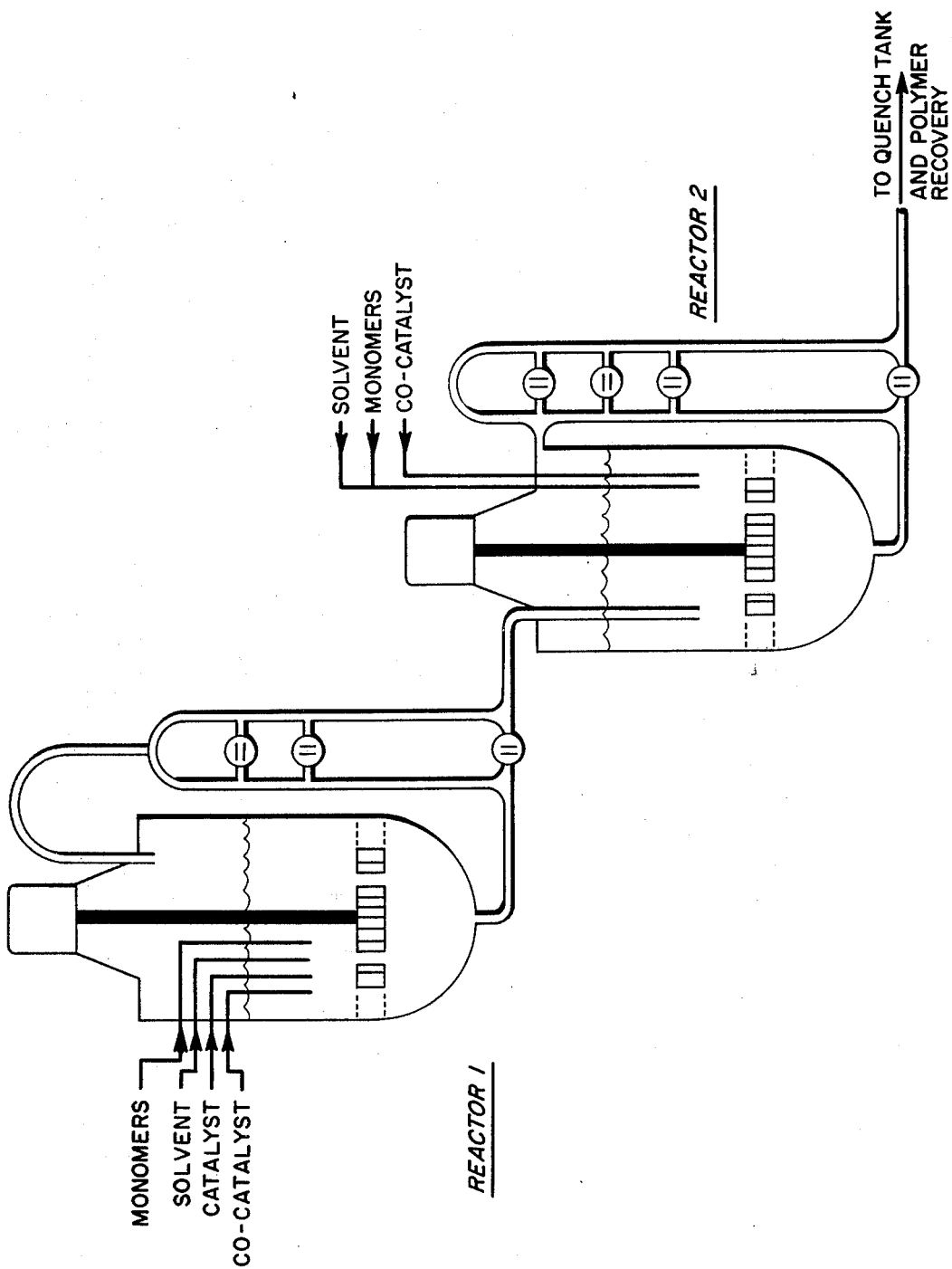

PROCESS AND PRODUCT

This is a continuation, of application Ser. No. 556,088, filed 3/7/75, now abandoned; which is a continuation of Ser. No. 267,441, filed 6/29/72, now abandoned.

BACKGROUND OF THE INVENTION

1. Field of the Invention

The invention is directed to an improved process for producing ethylene-higher alpha olefin elastomers. More particularly, the invention provides for the manufacture of EPDM elastomers having relatively broad molecular weight distribution, while having a very narrow compositional distribution.

2. Description of the Prior Art

Many Ziegler-type catalyst systems are known, the most common of which are the vanadium and titanium halides, either used alone or in combination, with the various organoaluminum reducing agents.

By using various combinations of these Ziegler catalyst systems, one is able to control molecular weight distribution, gel content, monomer sequence distribution and amount within the given EPDM elastomer, as well as many other polymer properties. Within this art, there is a correlation between weight average molecular weight and number average molecular weight, known as "polydispersity" (Q). Expressed empirically, this relationship is $\overline{M}_w/\overline{M}_n$. Q is known to range as high as about 20, which indicates a very broad molecular weight distribution within a given polymer sample.

This property, along with molecular weight, and polymer composition, directly effect the processability of the elastomer. However, until the present invention, it was not known how to obtain an EPDM elastomer containing a certain combination of properties. This combination is a broadened molecular weight distribution and a narrow compositional distribution.

It has been shown that certain Ziegler catalysts could be reactivated by using a series of at least three reactors. The EPDM reaction is conducted in all three reactors by adding all the catalyst to the first reactor and adding a reactivator to the subsequent stages. A recently issued patent with this teaching is U.S. Pat. No. 3,629,212. This method of production has the disadvantage of added cost of reactivator and purification problems.

SUMMARY OF THE INVENTION

It has now been discovered that the molecular weight distribution of EPDM may be broadened while narrowing the compositional distribution, in a continuous process, using a two-reactor series, without use of an activator. This is accomplished by feeding to the first reactor: solvent, monomers, catalyst, and organoaluminum cocatalyst at a temperature of from −50° to 150° C. and at a pressure ranging from 0 to 1000 psig; discharging the polymer cement from the first reactor and feeding same to the second reactor, along with additional monomer and cocatalyst. The second reactor is maintained at essentially the same temperature and pressure as the first reactor. The reactor contents are maintained at a relatively constant temperature by use of chilled diluent used in the reactor feed.

The resulting EPDM has a Q value of from 2 to 8. The product is prepared using as a catalyst, a catalyst component prepared from mixing $VOCl_3$ with $Ti(OR)_4$, where R is a $C_1$–$C_{12}$ alkyl group. Preferably the organoaluminum reducing agent is diethyl aluminuma chloride in the first reactor and an alkyl aluminum sesquihalide in the second reactor.

DESCRIPTION OF THE PREFERRED EMBODIMENTS

Referring to the drawing of the invention, monomers, solvents, catalyst and cocatalyst are fed continuously to the stirred Reactor 1. Without quenching or otherwise deactivating the catalyst components, except through attrition within the reactor, the polymer cement is fed directly from the Reactor 1 to Reactor 2. There is fed continuously to Reactor 2 additional monomer, cocatalyst, and solvent. No reactivator is fed to either reactor. The monomers are further polymerized in Reactor 2.

The temperature in the reactors is maintained relatively constant by use of heat exchangers or other conventional means. Preferably, the temperature is maintained by use of chilled diluent addition to the reaction zone.

Following polymerization in Reactor 2, the polymer cement is discharged and fed to catalyst deactivators where the cement is "quenched," polymer recovered and fed to the finishing operation. Conventional procedures and inactivating media may be used, following the second reactor, to inactivate the combined catalyst components and recover unreacted monomers, solvent and finished polymer from the reaction mixture. In common with all Ziegler-Natta polymerizations, all of the monomers, solvents and catalyst components are rigorously dried and freed from dissolved moisture or other constituents which are known to be harmful to the activity of the catalyst system. Feed tanks, lines and reactors may be protected by blanketing with a dry, inert gas such as nitrogen.

Hydrogen may be fed through independent lines to any stage or with the solvent to the first stage, or with the monomers in subsequent stages for the purpose of controlling the molecular weight.

The EPM or EPDM elastomer produced in the process is an interpolymer of ethylene and one or more higher alphaolefins having 3 to 8 carbon atoms, preferably propylene (EPM). There may be additionally added a nonconjugated acyclic or alicyclic diene, in order to provide unsaturation in the polymer (EPDM).

Monomers

While the invention disclosed herein is suitable for the homopolymerization of alpha-olefins such as ethylene, propylene, butene-1 and the like, a major object of this invention is the production of amorphous elastomeric copolymers of ethylene and a $C_3$ to $C_8$ alpha-olefin, and elastomeric terpolymers of ethylene, a $C_3$ to $C_8$ alpha-olefin and an acyclic or alicyclic nonconjugated diolefin.

Representative nonlimiting examples of $C_3$ to $C_8$ alpha-olefins that may be used as monomers with ethylene for the production of copolymers or terpolymers include:

A. Straight-chain acyclic alpha-olefins such as: propylene, butene-1, pentene-1, hexene-1 and octene-1.

B. Branched chain acyclic alpha-olefins such as 3-methyl butene-1, 4-methyl pentene-1 and 5,5-dimethyl hexene-1.

C. Alicyclic, i.e. carbocyclic, alpha-olefins such as vinyl cyclopentane, allyl cyclopentane and vinyl cyclohexane.

Representative nonlimiting examples of nonconjugated diolefins that may be used as the third monomer in the terpolymer include:

A. Straight-chain acyclic dienes such as: 1,4-hexadiene; 1,5-hexadiene; 1,6-octadiene.

B. Branched chain acyclic dienes such as: 5-methyl 1,4-hexadiene, 3,7-dimethyl 1,6-octadiene; 3,7-dimethyl 1,7-octadiene, and the mixed isomers of dihydro-myrcene and dihydro-ocimene.

C. Single ring alicyclic dienes such as: 1,4-cyclo-hexadiene; 1,5-cyclo-octadiene; 1,5-cyclododecadiene; 4-vinyl-cyclohexane; 1-allyl-4-isopropylidene cyclohexane; 3-allyl cyclopentene; 4-allyl cyclohexane and 1-isopropenyl 4-(4-butenyl) cyclohexane.

D. Multi-ring alicyclic fused and bridged ring dienes such as: tetrahydroindene; methyltetrahydroindene; dicyclopentadiene; bicyclo (2,2,1) hepta 2,5-diene; 2-methyl bicycloheptadiene; alkenyl, alkylidene, cycloalkenyl and cycloalkylidene norbornenes such as 5-methylene-2-norbornene, 5-ethylidene-2-norbornene, 5-propenyl-2-norbornene, 5-isopropylidene norbornene, 5-(4-cyclopentenyl)-2-norbornene; 5-cyclohexylidene-2-norbornene.

In general, useful nonconjugated diolefins contain from 5 to 14 carbon atoms, and terpolymers containing the same exhibit viscosity average molecular weights ranging from about 30,000 to 350,000, preferably from about 100,000 to 250,000 as determined in decalin at 135° C.

Structurally the terpolymers of the instant invention may be illustrated for various third nonconjugated diene monomers as random polymers having the following moieties:

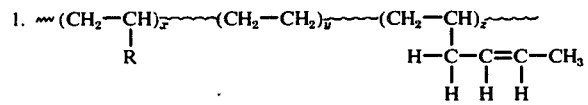

Higher α-Olefin Units   Ethylene Units   1,4-Hexadiene Units

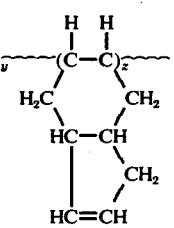

Higher α-Olefin Units   Ethylene Units   Tetrahydro-indene Units

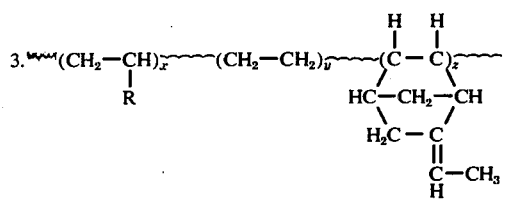

Higher α-Olefin Units   Ethylene Units   5-Ethylidene-2-Norbornene Units in which $x$, $y$ and $z$ are integers, typically in the range of 1 to 15.

Solvents and Dispersants

Suitable media for dissolving or dispersing the catalyst components and reaction products and for heat exchange may be selected from the general group of petroleum hydrocarbons and halogenated hydrocarbons. $C_{12}$ or lower, straight or branched chain saturated hydrocarbons are preferred but $C_5$ to $C_9$ saturated alicyclic or aromatic hydrocarbons may be used with equal facility. Halogenated hydrocarbons having two to six carbons in the molecule are also useful. Liquid propylene monomer is also useful. Representative nonlimiting solvents and dispersants which are also useful for the removal of the heat of reaction are: propylene, propane, butane, pentane, cyclopentane, hexane, cyclohexane, methyl cyclopentane, heptane, methyl cyclohexane, isooctane, benzene, toluene, mixed xylenes, cumene, dichloroethane, trichloroethane, orthodichloro benzene and tetrachloroethylene (per-chloroethylene).

Principal Catalysts

Catalyst useful in the practice of this invention are selected from the group of transition metal compounds comprising Groups IV$b$, V$b$ and VI$b$ of the Periodic Table of the elements. Particularly useful are compounds of vanadium and titanium. Most preferred are compounds of vanadium having the general formula $VO_zX_t$ wherein z has a value of 0 to 1 and $t$ has a value of 2 to 4. X is independently selected from the group consisting of halogens having an atomic number equal to or greater than 17, acetylacetonates, haloacetylacetonates, alkoxides and haloalkoxides. nonlimiting examples are: $VOCl_3$; $VCl_4$; $VO(OEt)_3$; $VO(AcAc)_2$; $VOCl_2(OBu)$; $V(AcAc)_3$ and $VOCl_2AcAc$ where (AcAc) is an acetyl acetonate. Preferred is $VOCl_3$.

Titanium compounds which can be used in combination with vanadium compounds, have the general formula $Ti(OR)_4$ wherein R is an acyclic or alicyclic monovalent hydrocarbon radical of one to twelve carbon atoms.

Most preferred among the useful catalysts are vanadyl trichloride ($VOCl_3$), vanadium tetrachloride ($VCl_4$), and tetrabutyl titanate ($Ti(OBu)_4$) used in combination with $VOCl_3$.

Cocatalysts

Cocatalysts useful in the practice of this invention comprise organometallic reducing compounds from Groups IIa, IIb and IIIa, particularly organoaluminum compounds having the general formula $AlR'_mX'_n$ wherein R' is a monovalent hydrocarbon radical selected from the group consisting of $C_1$–$C_{12}$ alkyl, alkylaryl, and cycloalkyl radicals, m is a number from 1 to 3, X' is a halogen having an atomic number equal to or greater than 17 (Cl, Br and I) and the sum of m and n is equal to three. Various mixtures of cocatalyst may be employed.

Nonlimiting examples of useful cocatalysts are Al(Et)$_3$, Al(isoBu)$_3$, Et$_2$AlCl, EtAlCl$_2$ and Et$_3$Al$_2$Cl$_3$.

Reaction Conditions

1. Temperature: Suitable temperatures for conducting the polymerization are −50° C. to 150° C., preferably 0° C. to 100°, most preferably 10° to 70° C.

2. Pressure: The pressure at which the polymerization is conducted will depend on the temperature of reaction and polymerization rate but in any case, the pressure is maintained at a sufficient level so as to be equal to the combined vapor pressure of the solvent and reaction components. For the most preferred temperature range, the pressure required to maintain the reactants in the liquid phase is in the order of 60–300 psig.

3. Monomer Concentration: Depending on whether an EPR copolymer elastomer or EPDM terpolymer elastomer is to be produced, the monomers can be fed to the first and subsequent stages in a preferred mole ratio. Monomer feeds to all stages can be set for a typical EPDM for example: Ethylene, 2 to 15 pts. by wt. per 100 pts. by wt. of solvent, preferably 3 to 10; Propylene, 4 to 30 pts. by wt. per 100 pts. by wt. of solvent, preferably 6 to 20 pts. by wt. per 100 pts. by wt. of solvent; and 5-Ethylidene-2-norbornene, 0.1 to 5 pts. by wt. per 100 pts. by wt. of solvent, preferably 0.3 to 3 pts. by wt. per 100 pts. by wt. of solvent.

4. Catalyst Concentration: Transition metal catalyst, for example $VOCl_3$, prediluted, if desired, with solvent is fed to the first reactor so as to provide a concentration in the total solvent of from 0.01 to 5.0 millimoles per liter, preferably 0.05 to 0.5 millimoles per liter.

The organoaluminum cocatalyst which may also be prediluted with solvent is fed at the same time to the first stage in a sufficient amount to promote the transition metal catalyst to maximum activity. Typical mole ratios or organoaluminum compound to transition metal catalyst is in the range of 1.0 to 20 moles of organoaluminum compound per mole of transition metal compound.

An amount of organoaluminum compound equal to, less than, or greater than the amount of organoaluminum compound fed to the first reactor, may be fed to the second reactor.

Hydrogen, for the control of molecular weight and molecular weight distribution may be fed to all stages in the proportion of 1.0 to 10,000 ppm of ethylene.

From the above it will be seen that in accordance with this invention any combination of monomers, cocatalysts and hydrogen may be added to the second stage. The transition metal catalyst component may be added to only the first stage.

An alternative arrangement of reaction zones may be provided in order to accomplish the superior results achieved by using 2 reactors in series. Within a single reactor, a horizontal baffle may be inserted, dividing the reactor with two separate and distinct zones for polymerization.

In such an arrangement, separate feed inlets are provided for each reaction zone. The same sequence of adding solvent, monomers, catalyst and cocatalyst is provided to each zone, as in the case of two separate reactors.

In both methods, there is provided the opportunity to manipulate addition of the various feed components. Depending on the particular polymer composition desired, additional ethylene, higher alpha olefin, or non-conjugated diene could be added to the second reactor or zone, singly or in a particular combination. Alternatively, all monomers added to Reactor 1 could also be added to Reactor 2.

Another variable could be in the use of a different organoaluminum in Reactor 2, from that used in Reactor 1. Thus, for example, if diethylalunimum chloride is used as the cocatalyst in Reactor 1, ethyl aluminum sesquichloride could be added to Reactor 2. Interesting effects on molecular weight distribution have been discovered using this technique.

The following examples more fully illustrate the instant invention and show the improvement over the prior art.

EXAMPLE 1

Two reactors, provided with cooling jackets (not shown) arranged in series as in the Drawing were used for the following experiments. Under steady state conditions, the volume of Reactor 1 at overflow was 1.5 gal. and the volume of Reactor 2 was 1.5 gal. Temperature was maintained in Reactors 1 and 2 by prechilling the reactor feed by circulating within the jacket chilled water upon demand of a sensitive temperature controller. Catalyst component, in solvent, fed to the reactor was accurately metered by means of a feed pump.

Temperature of both reactors was maintained at 32° C.

Ethylene-propylene-ENB polymer produced in the first stage was fed as a cement to the second stage where the additional catalyst components were added and additional polymerization occurred.

Monomer and catalyst components were added to the reactors in the amounts shown in Table I. In this example, the monomer feed is split between Reactors 1 and 2, with all of the catalyst and cocatalyst being fed to Reactor 1. Hexane solvent was added to both reactors. Reactor temperature was about 32° C. and pressure was maintained at about 60 psig.

TABLE I

| Feed (gram/100 g. hexane) | Divided Monomer Feed Reactor 1 | Reactor 2 |
| --- | --- | --- |
| Hexane (gram/hr.) | 15,000 | 15,000 |
| Ethylene | 1.50 | 1.50 |
| Propylene | 4.50 | 4.50 |
| ENB | 0.09 | 0.09 |
| $VOCl_3$ | 0.0075 | — |
| Ti(O Butyl)$_4$ | 0.0075 | — |
| Et$_2$AlCl | 0.0315 | — |
| Residence Time, min. | 6.6 | 6.6 |
| Catalyst Efficiency (g.polymer/ g. $VOCl_3$ | 620 | |
| Propylene Conversion, % | 21 | |

The resulting polymer was compounded as follows:

| | | |
| --- | --- | --- |
| Polymer | 100 | parts |
| FEF Black | 70 | |
| SRF Black | 30 | |
| Naphthenic oil (Flexon 886) | 100 | parts |
| Steric Acid | 1 | |
| ZnO | 5 | |
| Sulfur | 0.85 | |
| TMTDS | 0.5 | |
| TDEDL (80%) | 0.5 | |
| DPTTS | 0.5 | |
| MBT | 0.5 | |

The compounded polymer, cured for 20 minutes at 320° F., had the following properties:

| | |
| --- | --- |
| Tensile, psi | 1720 |
| Elongation, % | 660 |
| 300% modulus | 620 |
| Shore A | 46 |

The original polymer had a ML-260 (1+8) of 42 and an ethylene content of 60.5 weight percent. The number average molecular weight ($\overline{M}n$) of $70.0 \times 10^{-3}$, while the inherent viscosity (I.V.) was 3.0.

EXAMPLE 2

Using the same equipment as in Example 1, and following the same general procedure, monomer and catalyst components were added to the reactors in the amounts shown in Table IIA. In this example the monomer feed is split between Reactors 1 and 2, with all of the catalyst and cocatalyst being fed to Reactor 1, except for the addition of a second cocatalyst, ethyl aluminum sesquichloride, being added to Reactor 2.

TABLE IIA

| Feed (g/100 g. hexane) | Divided Monomer and Second Cocatalyst | |
|---|---|---|
| | Reactor 1 | Reactor 2 |
| Hexane (g/hr) | 15,000 | 15,000 |
| Ethylene | 1.50 | 1.50 |
| Propylene | 4.50 | 4.50 |
| ENB | 0.09 | 0.09 |
| $VOCl_3$ | 0.0075 | — |
| $Ti(OBu)_4$ | 0.0075 | — |
| $Et_2AlCl$ | 0.0315 | — |
| $Et_3Al_2Cl_3$ | — | 0.0107 |
| Reactor temperature | 32° C. | |
| Pressure | 60 psig | |
| Residence Time, min. | 6.6 | |
| Catalyst Efficiency (g. polymer/g. $VOCl_3$) | 613 | |
| Propylene conversion, % | 21 | |
| Weight % Ethylene | 59.5 | |
| Weight % ENB | 2.9 | |
| ML-260 (1+8) | 30 | |
| I.V. | 2.7 | |
| $\overline{M}n \times 10^{-3}$ | 70.0 | |

After compounding the recovered polymer, in the same manner as in Example 1, the polymer was cured for 20 min. at 320° F. The cured polymer had the following properties:

TABLE IIB

| Properties | |
|---|---|
| Tensile, psi | 1670 |
| Elongation, % | 680 |
| 300 % Modulus | 585 |
| Shore A | 44 |

The polymers of both Examples 1 and 3 clearly demonstrate more rubberiness over the polymer produced, as a control, in Example 3, below. In addition, elution fraction studies on these polymers demonstrate a very narrow compositional distribution. This was confirmed by infra-red studies and I.V. determinations (in decalin).

EXAMPLE 3

Following the procedure of Example 2, but adding all monomer and catalyst (including cocatalyst) to only the first reactor, a polymer was produced having the properties shown in Table III.

TABLE III

| | Control Run |
|---|---|
| ML-260 (1+8) | 29 |
| Wt. % ethylene | 57.7 |
| Wt. % ENB | 3.5 |
| I.V. | 2.1 |
| $Mn \times 10^{-3}$ | 57.0 |
| Compounded polymer (as in Ex. 2) | |
| Tensile, psi | 1300 |
| Elongation, % | 590 |
| 300 % Modulus | 480 |
| Shore A | 44 |

What is claimed is:

1. A continuous process for the production of elastomeric copolymers of ethylene and a higher $C_3$ to $C_{10}$ alpha-olefin, which may additionally have polymerized therewith an acyclic or alicyclic nonconjugated diolefin which comprises connecting two stirred reactors in series,
   1. adding to the first reactor:
      ethylene, a higher $C_3$ to $C_{10}$ alpha-olefin, or additionally said acyclic or alicyclic nonconjugated diolefin, a Ziegler-Natta type catalyst consisting of at least one transition metal component and an organoaluminum cocatalyst consisting of a dialkyl aluminum halide having the formula $R_2AlX$, where R is a monovalent hydrocarbon radical, selected from the group consisting of $C_1$ to $C_{13}$ alkyl, alkylaryl, and cycloalkyl radicals, X is a halogen having an atomic number equal to or greater than 17;
   2. polymerizing a portion of the monomers in the first reactor at a temperature in the range of 0° to 100° C., at a pressure of from 0 to 1000 psig, to form a polymer cement;
   3. passing said polymer cement from the first reactor to a second reactor, connected in series with said first reactor;
   4. adding to said second reactor:
      ethylene, said higher $C_3$ to $C_{10}$ alpha-olefin, additional acyclic or alicyclic nonconjugated diolefin and an organoaluminum cocatalyst consisting of an alkyl aluminum sesquihalide having the formula $R_mAlX_n$, where R is a monovalent hydrocarbon radical selected from the group consisting of $C_1$ to $C_{12}$ alkyl, alkylaryl, and cycloalkyl radicals, m and n are each equal to 1.5, X is a halogen having an atomic number equal to or greater than 17;
   5. further polymerizing the monomers at essentially the same conditions as in the first reactor;
   6. discharging the contents from the second reactor and terminating the polymerization reaction of said discharged contents; and
   7. collecting and finishing the copolymer.
2. The process of claim 1 wherein the monomer feed comprises ethylene, propylene, and a minor portion of a nonconjugated acyclic or alicyclic diolefin.
3. The process of claim 2, wherein said nonconjugated diolefin is 5-ethylidene-2-norbornene.
4. The process of claim 1, wherein the organoaluminum cocatalyst added to the first reactor is diethyl aluminum chloride and the organoaluminum cocatalyst added to the second reactor is ethylaluminum sesquichloride.
5. The process of claim 1, wherein the transition metal component is $VOCl_3$.
6. The process of claim 1, wherein the transition metal component is $VOCl_3$ used in combination with Ti(O butyl)$_4$.
7. The process of claim 1, wherein said acyclic or alicyclic nonconjugated diolefin is 5-ethylidene-2-norbornene.
8. The process of claim 1 wherein solvent is added to each of the two reactors.

* * * * *